Figure 4:
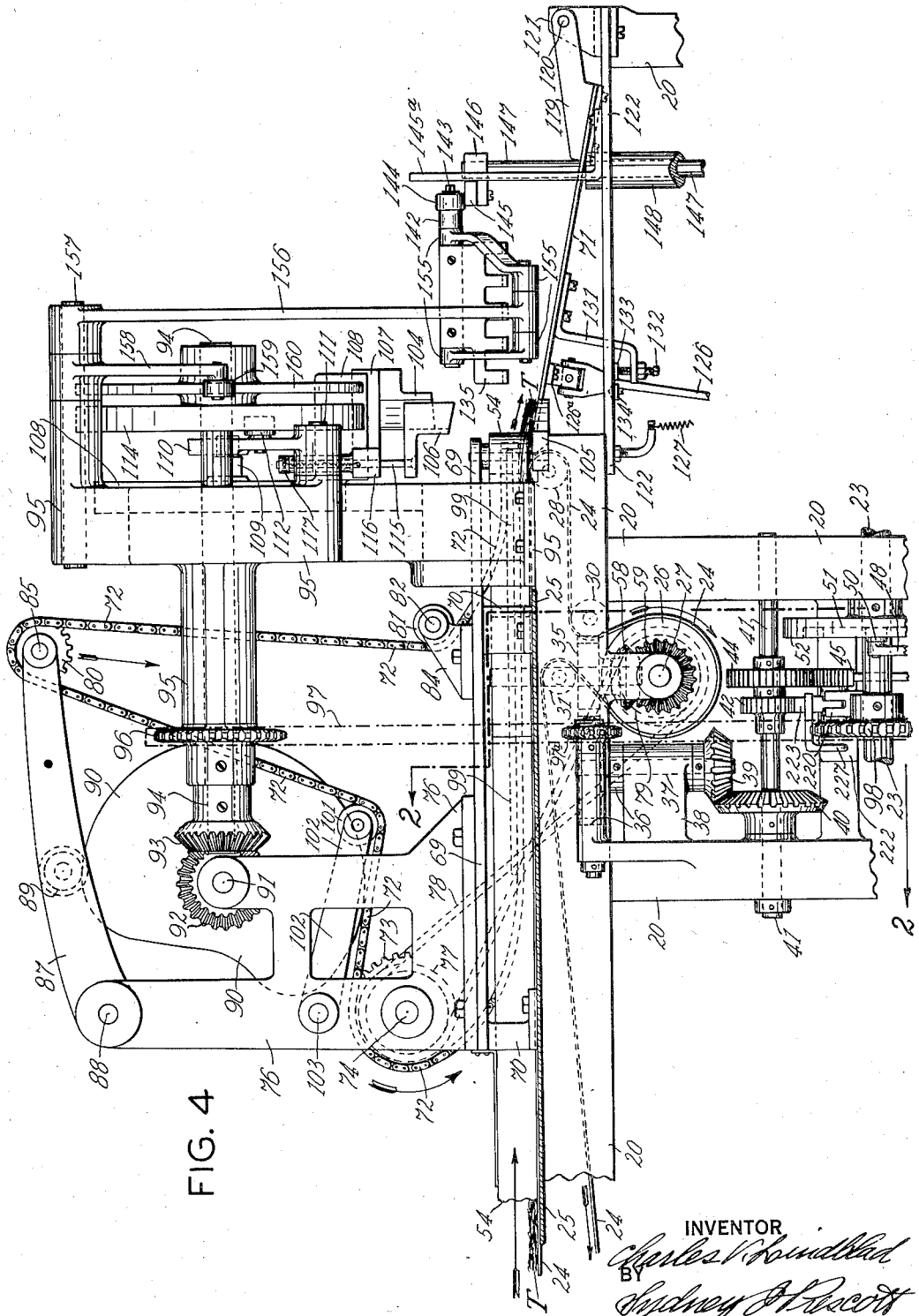

Oct. 23, 1934.　　　C. V. LINDBLAD　　　1,977,994
FILLER FEED FOR CIGAR MACHINES
Filed March 7, 1933　　　8 Sheets-Sheet 1
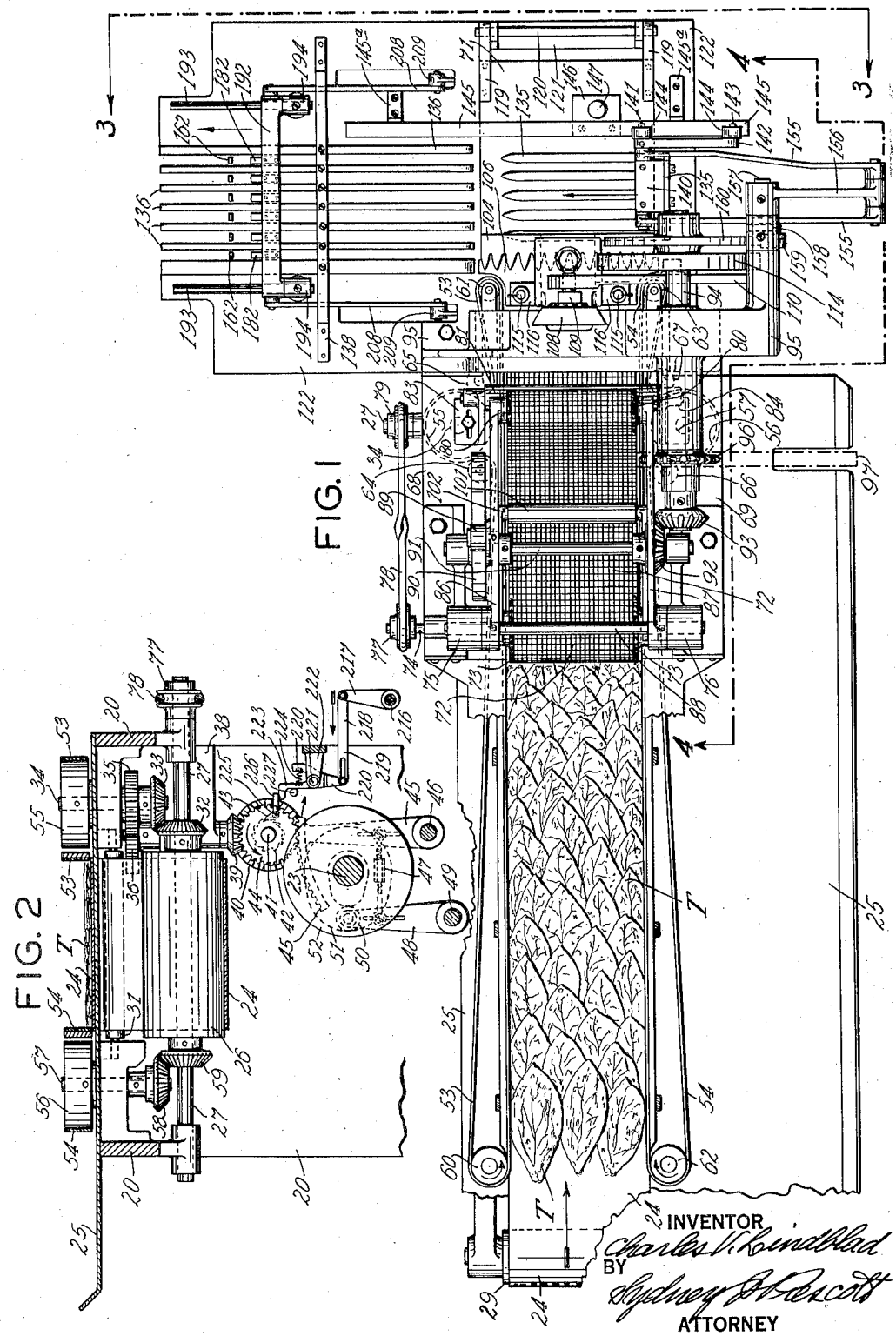
INVENTOR
Charles V. Lindblad
BY
Sydney B. Ascott
ATTORNEY

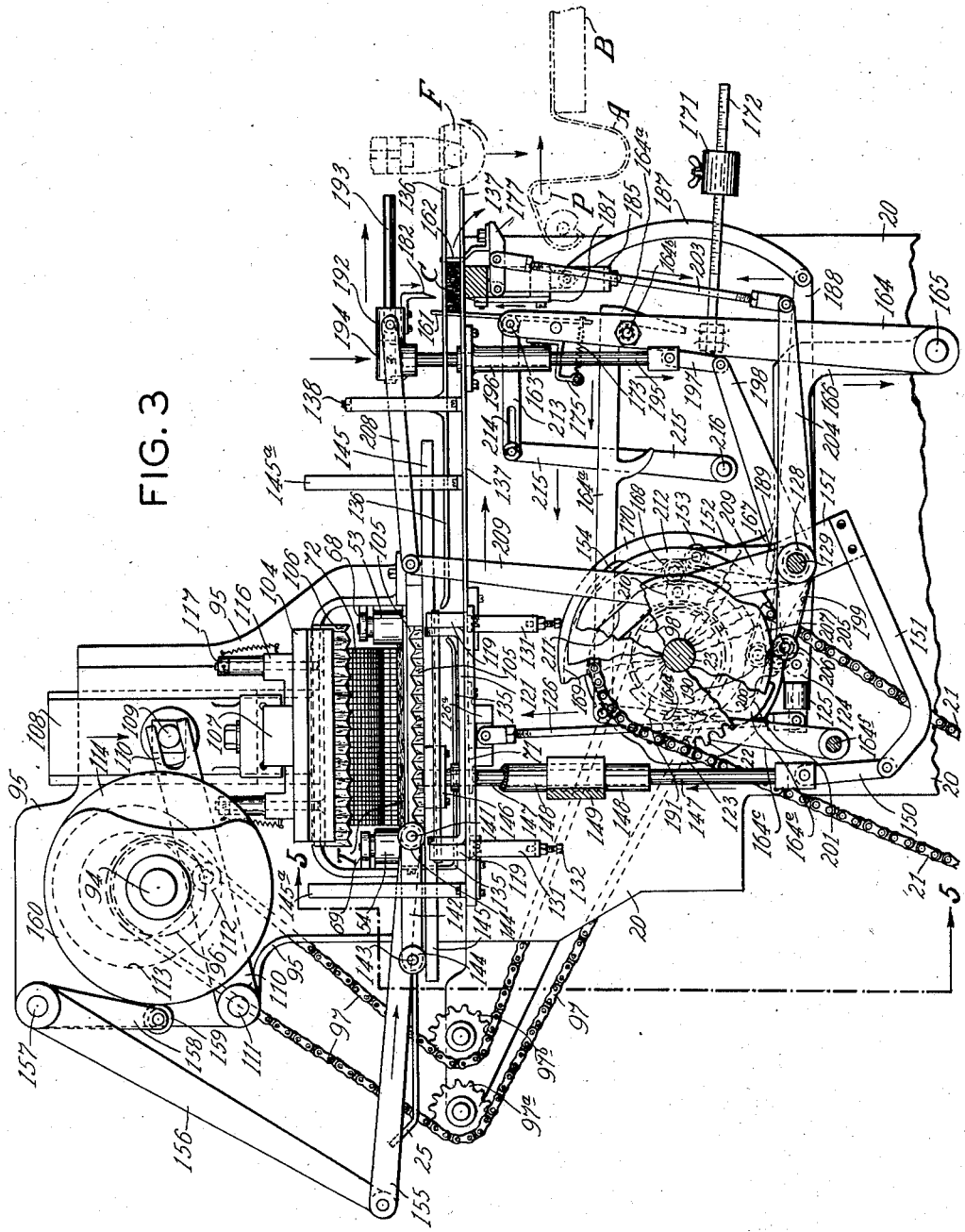

Oct. 23, 1934.                C. V. LINDBLAD                1,977,994
                    FILLER FEED FOR CIGAR MACHINES
                  Filed March 7, 1933        8 Sheets-Sheet 4
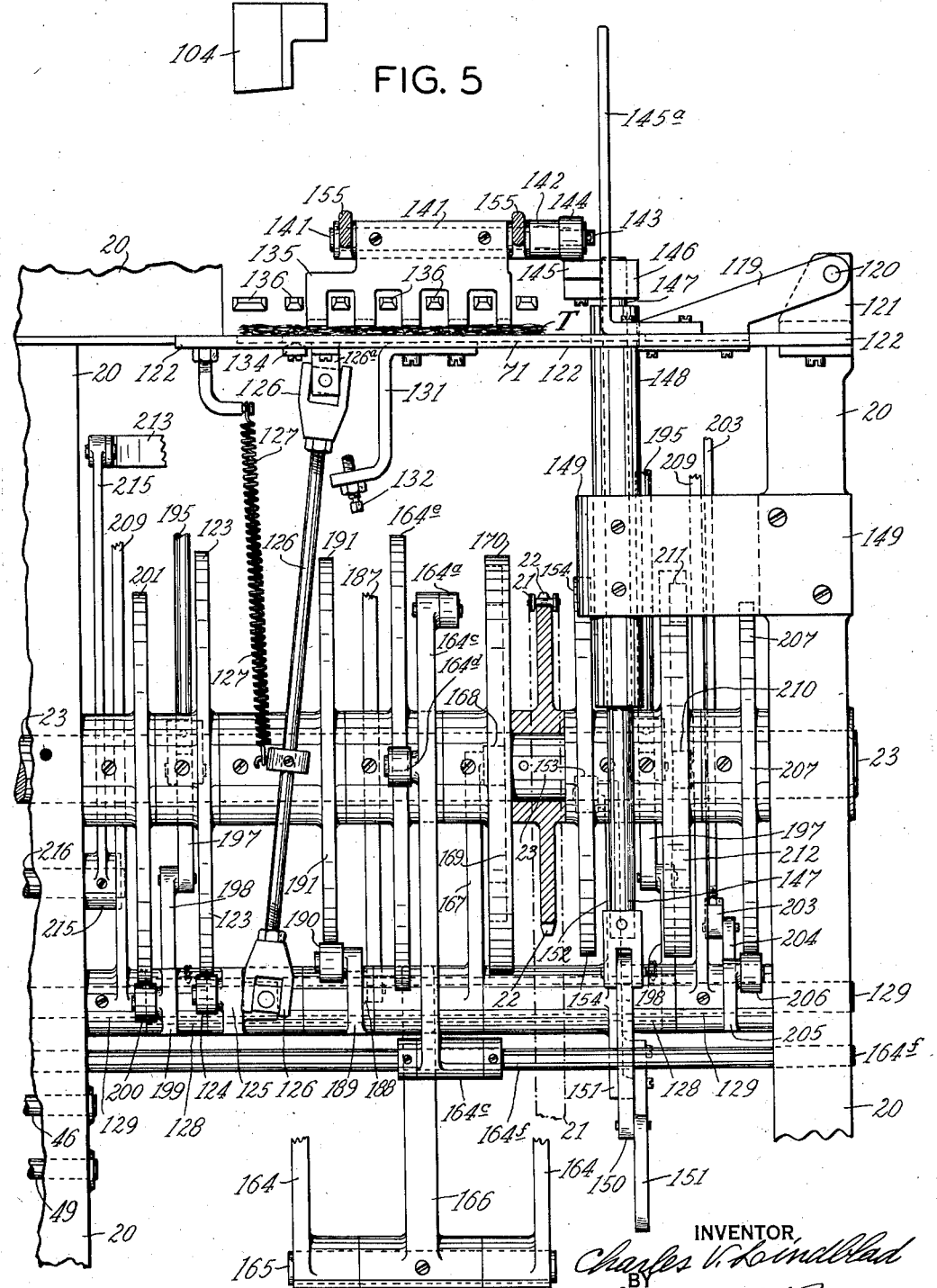

Oct. 23, 1934.  C. V. LINDBLAD  1,977,994
FILLER FEED FOR CIGAR MACHINES
Filed March 7, 1933    8 Sheets-Sheet 5
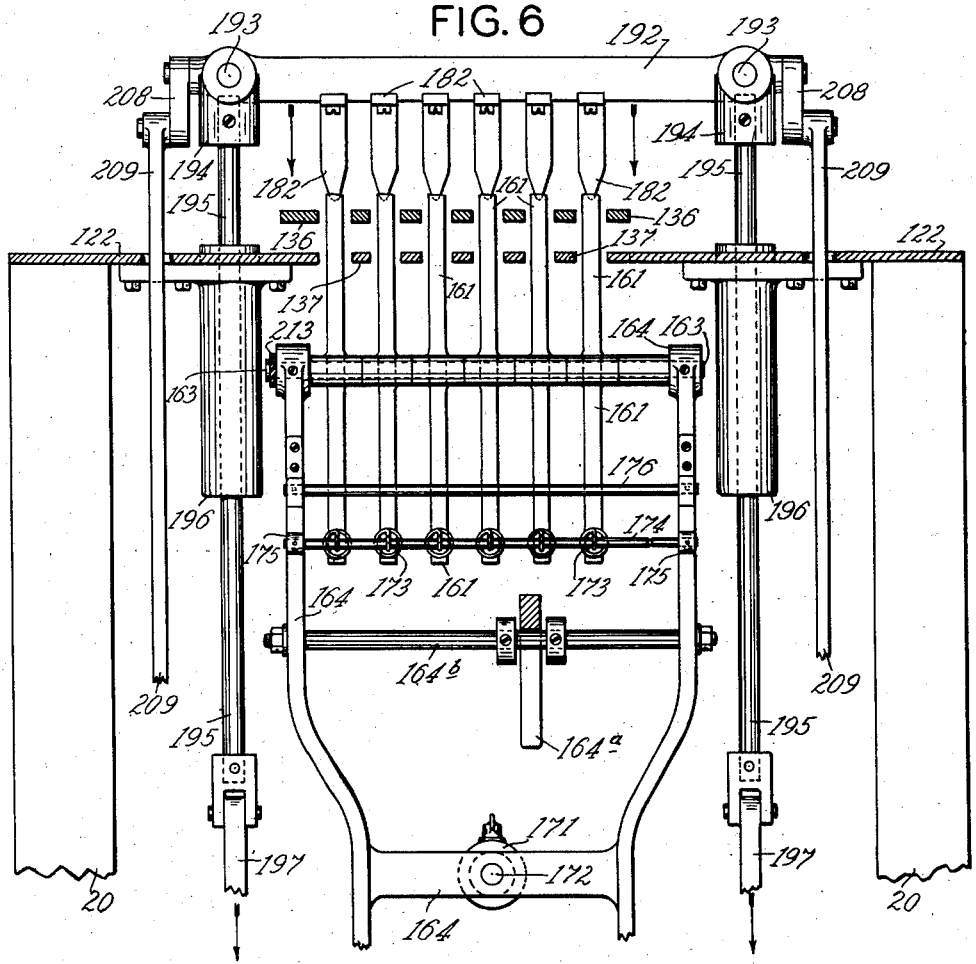
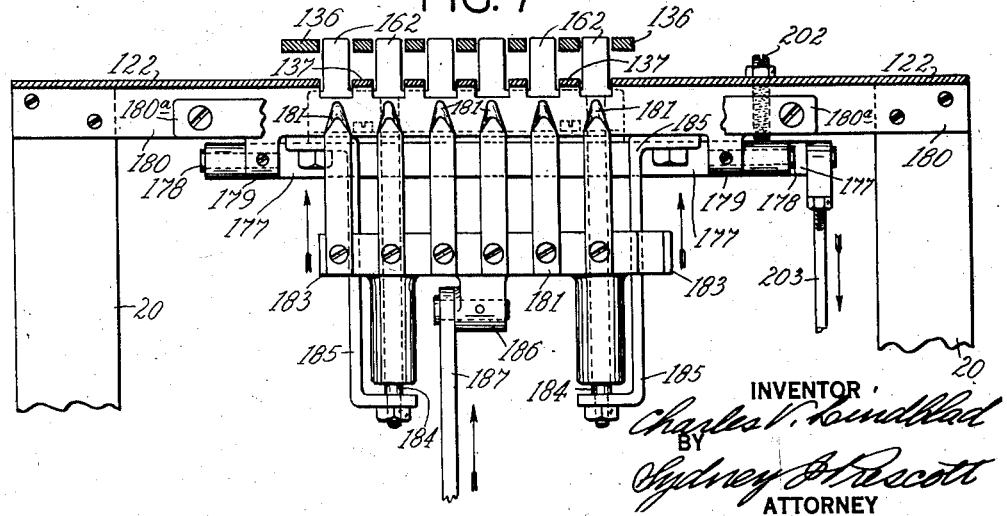

Oct. 23, 1934.                C. V. LINDBLAD                1,977,994
                       FILLER FEED FOR CIGAR MACHINES
                    Filed March 7, 1933        8 Sheets-Sheet 6
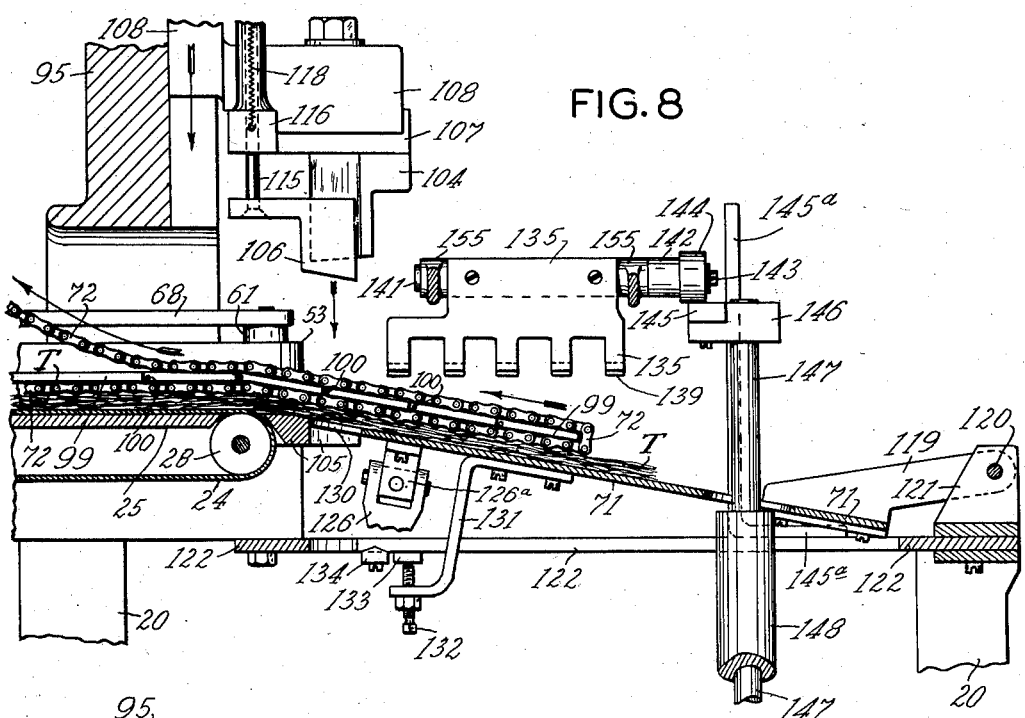
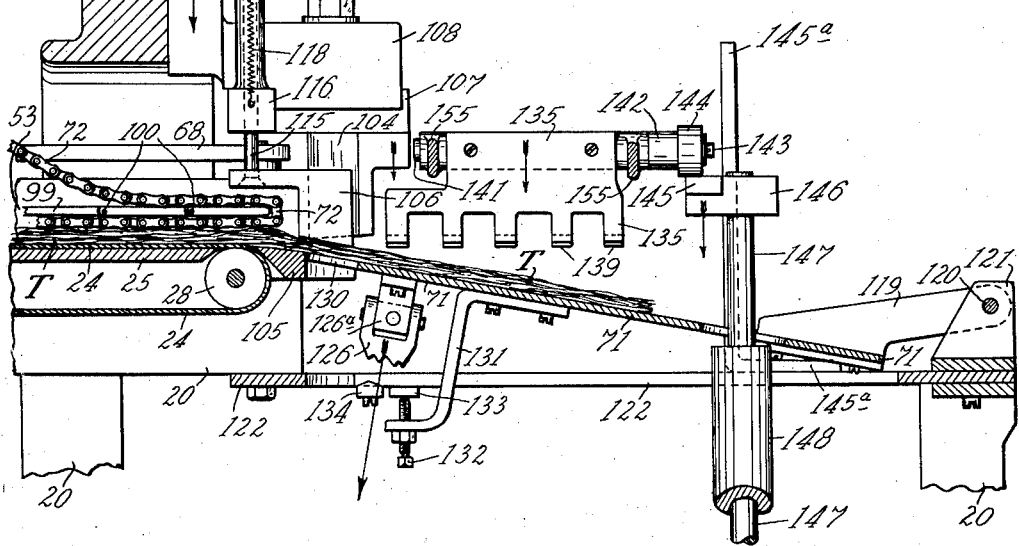
INVENTOR
Charles V. Lindblad
BY
Sydney J. Prescott
ATTORNEY Oct. 23, 1934.  C. V. LINDBLAD  1,977,994
FILLER FEED FOR CIGAR MACHINES
Filed March 7, 1933  8 Sheets-Sheet 7

INVENTOR.
Charles V. Lindblad
BY Sydney B. Prescott
ATTORNEY

Oct. 23, 1934.    C. V. LINDBLAD    1,977,994
FILLER FEED FOR CIGAR MACHINES
Filed March 7, 1933    8 Sheets-Sheet 8
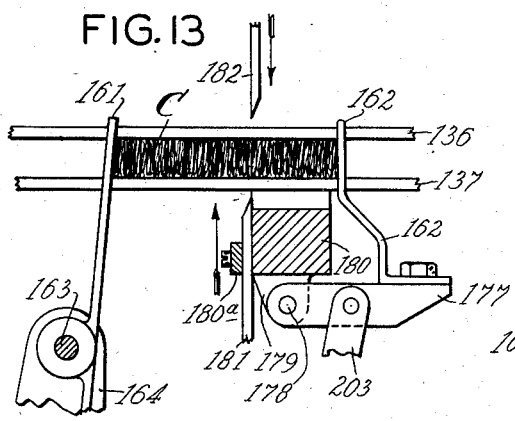
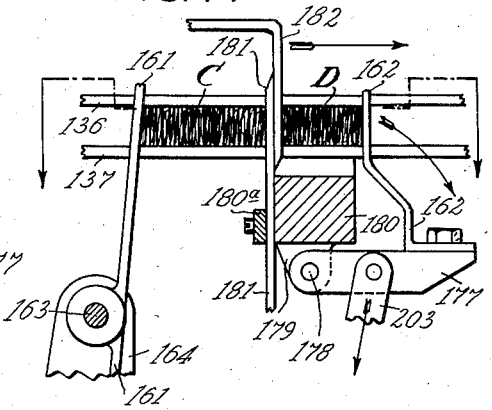
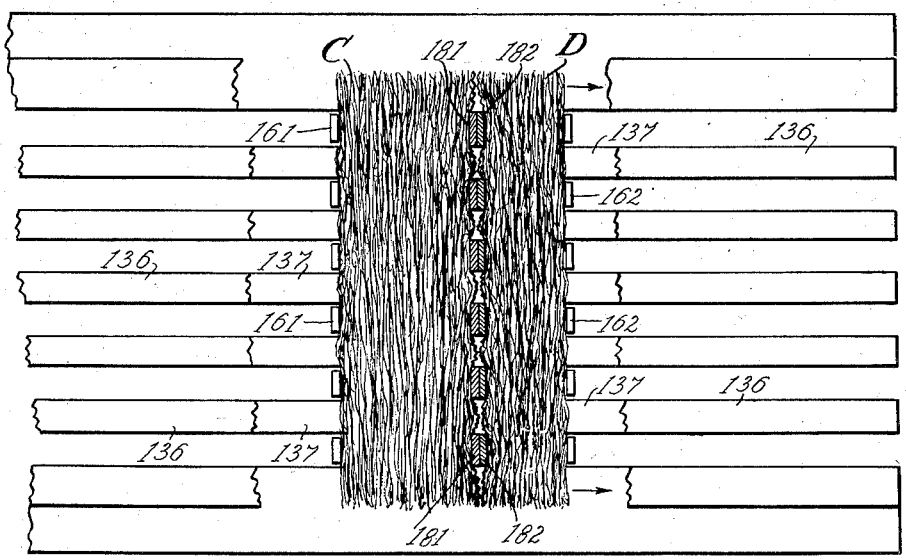
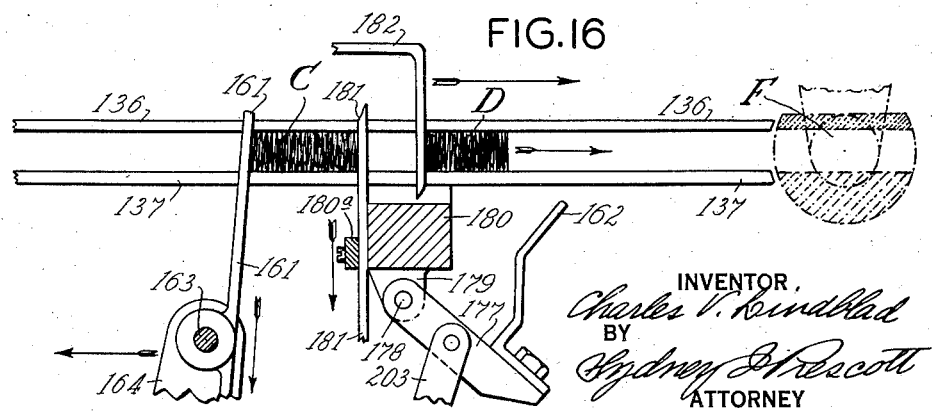
INVENTOR,
Charles V. Lindblad
BY
Sydney Prescott
ATTORNEY Patented Oct. 23, 1934

1,977,994

UNITED STATES PATENT OFFICE 1,977,994

FILLER FEED FOR CIGAR MACHINES

Charles V. Lindblad, Brooklyn, N. Y., assignor to International Cigar Machinery Company, a corporation of New Jersey Application March 7, 1933, Serial No. 659,961

40 Claims. (Cl. 131—39)

This invention relates to tobacco feeds, particularly for long filler cigar machines, its main object being to produce improved charges of tobacco which will result in round springy bunches of even density similar to well made hand made bunches.

In filler feeds heretofore employed it has been the practice to lay the tobacco leaves on top of each other to a thickness approximately equal to that of the desired charge and to feed this thick layer by feed means which compressed the layer and delivered it to a charge cutting position from which a charge was cut off and transferred to the bunch rolling mechanism. The charges produced in this manner due to the pressure applied to the tobacco are sometimes somewhat more compacted than desirable particularly when the tobacco is somewhat moist and moreover the broad flat surface formed by the cut tends to produce flat bunches. One of the principal objects of the invention therefore is to provide bunches free from these defects. In pursuance of the above objects it is the purpose of the present invention to produce means for crimping or pleating a relatively thin layer of tobacco to form a bunch which because of its crumpled or pleated formation is springy and round requiring less material for a bunch having the same size and feeling of firmness.

Another object of the invention is to provide a new method of filler feeding and a new type of cross feed both of which utilize a wide thin layer of leaves laid flat, thus relieving the filler girl of the duty of building up a thick or charge high column or layer and substituting a method and mechanism for building up the thicker layer which will produce more desirable cigars and be more uniform. In this connection it is an object to provide means which will satisfactorily feed thin flat layers of tobacco leaves.

To the end of avoiding flat bunches, it is an object of the invention to provide mechanism which will tear rather than cut the filler charge from a main mass of filler material, thus to a large extent eliminating a flat cut surface at the point where the charge was separated.

Still another object of the invention is to provide what is known in the art as a cross feed to deliver a stream of tobacco from one feedway to another at an angle thereto which will be adapted to handle the thin loose layer of tobacco utilized in the present construction, and which will avoid certain difficulties common to cross feeds, namely, disturbances or telescoping or arching of the tobacco at the point where the forward end of the tobacco layer is projected onto the surface of the adjacent feedway. For this purpose it is an object of the invention to provide means contacting with and traveling in the same direction as the tobacco layer or stream which is capable of being projected out over the adjacent feedway and subsequently retracted to provide the tobacco forwarding feeding surface in engagement with the forwarded bunch length of the tobacco layer after it has been projected beyond the supporting feeding member. Indeed it is an object of the invention to provide means which will satisfactorily feed thin loose layers of tobacco over relatively stationary surfaces beyond any underlying feeding belt or support.

With these and other objects not specifically mentioned in view, the invention consists in certain constructions and combinations which will be hereinafter fully described and then particularly pointed out in the claims hereunto appended.

Figure 10:
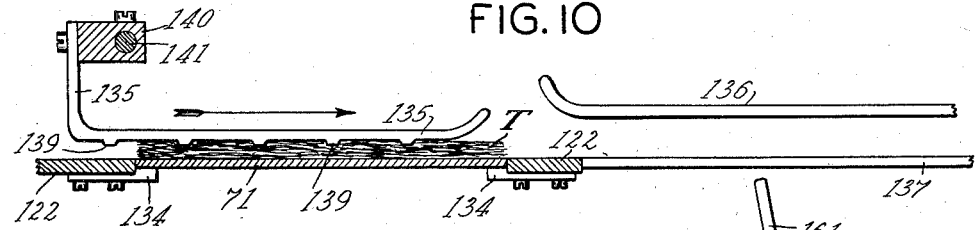
Figure 11:
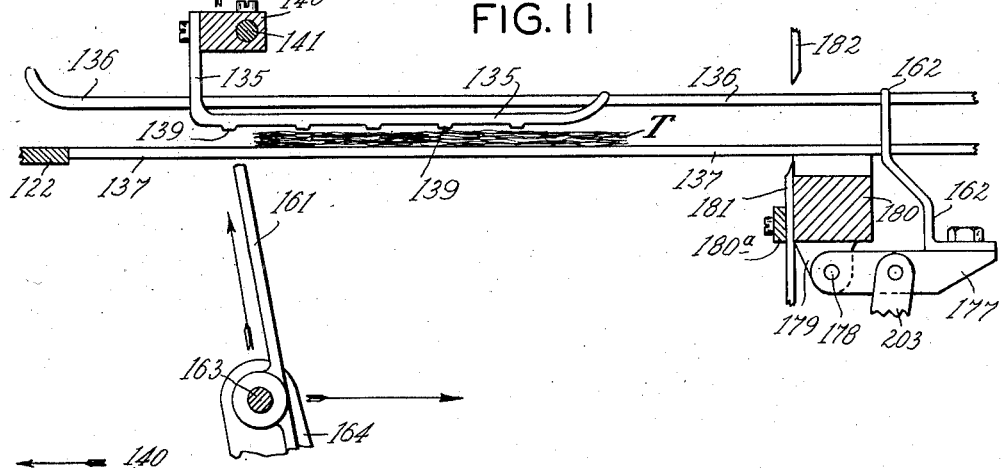
Figure 12:
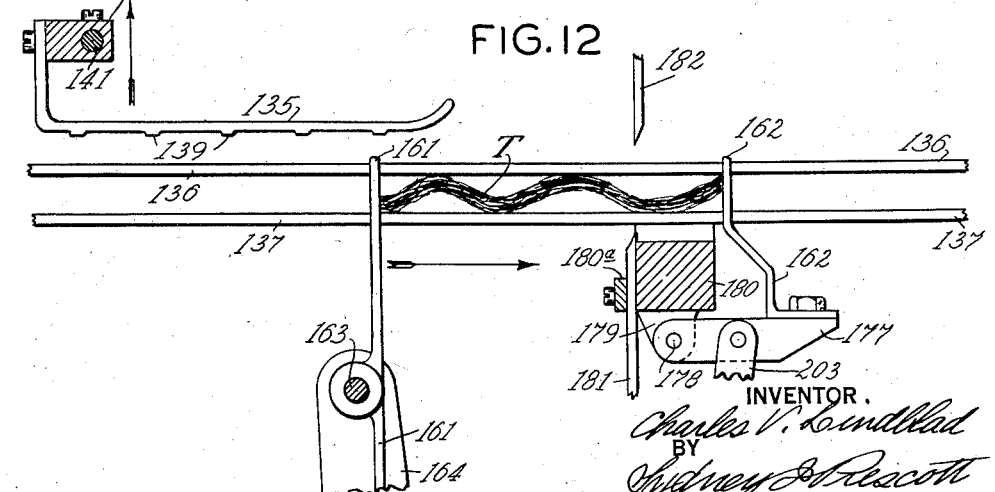

In the accompanying drawings which form a part of this specification and in which like characters of reference indicate the same or like parts, Fig. 1 is a plan view of a cigar filler feed constructed in accordance with the invention; Fig. 2 is a partial sectional end elevation of the feed belt driving mechanism, taken on line 2—2 of Fig. 4; Fig. 3 is an end elevation partially in section and partially broken away of the feed seen from line 3—3 of Fig. 1; Fig. 4 is a side elevation partly in section of the filler feed, taken on line 4—4 of Fig. 1; Fig. 5 is an end elevation partly in section and partly broken away of the driving mechanism, taken on line 5—5 of Fig. 3; Fig. 6 is a sectional end elevation of the measuring fingers and the top piercers; Fig. 7 is a detail sectional end elevation showing the filler tearing fingers and associated parts; Fig. 8 is a detail sectional side elevation showing the manner of guiding the layer of tobacco from one feedway to another; Fig. 9 is a detailed sectional side elevation showing the endless chain belt and the cutting of the tobacco by the corrugated cutter; Figs. 10 and 11 are detailed side elevations showing tobacco feeding operations of the device; Fig. 12 is a detail sectional side elevation showing the pleating operation; Fig. 13 is a detail sectional side elevation showing the column of tobacco produced by the measuring fingers and by the measuring gate; Fig. 14 is a detail sectional side elevation showing how the charge is severed from the column by the piercers; Fig. 15 is a detail sectional plan view of Fig. 14, taken on line 15—15 of Fig. 14; and Fig. 16 is a detail sectional side elevation showing how the charge is conveyed to the filler transfer by the piercers.

In carrying the invention into effect there is provided in a cigar machine, the combination with a table, of means for forwarding a layer of tobacco over said table, tobacco confining means overlying said table and spaced above the same a distance substantially greater than the thickness of said layer, co-acting members adapted to engage the ends of said layer, and devices for producing a relative approaching movement of said members to first pleat the layer and then squeeze the pleated layer to a predetermined density to form a filler charge. Preferably means are provided for separating a charge from the filler mass comprising a transverse series of prongs entering the layer of filler tobacco from below, a second series entering the tobacco from above in close proximity to the first series, together with means for giving a series of prongs relative separating movement to tear the charge from the remainder of the filler mass. In the best constructions, means are provided for forwarding a bunch length of filler tobacco at the forward end of a stream of said tobacco over a relatively stationary surface, comprising mechanism for separating and feeding forwardly the portion of said stream to the rear of said length, together with devices resting on the surface of said length and means causing said devices to move forward in synchronism with the operation of said mechanism. The various means referred to may be varied widely in construction within the scope of the claims, for the particular device selected to illustrate the invention is but one of many possible concrete embodiments of the same. The invention therefore is not to be restricted to the precise details shown and described.

The filler feeding mechanisms are mounted on a main frame 20 and driven from a motor or any other convenient source of power by means of a chain 21 driving a sprocket 22 mounted on the main drive and cam shaft 23.

The filler feed belt 24 of the cross feed or secondary feed, which initially receives the tobacco leaves, is supported by a feed table 25 attached to the main frame 20 and driven by a roller 26 mounted on a shaft 27 supported by bearing brackets of the main frame 20. The feed belt 24 is guided over idler rollers 28 and 29 also supported in bearings of main frame 20. The belt 24 is kept tight by rollers 30 and 31 placed in main frame 20. The shaft 27 is driven by means of a gear 32 meshing with a gear 33 (Fig. 2), mounted on shaft 34 supported in the main frame 20. On shaft 34 is mounted a gear 35 meshing with a gear 36 mounted on shaft 37 (Fig. 4), supported in a bearing bracket 38 of main frame 20. Shaft 37 is actuated by means of a bevel gear 39 meshing with a bevel gear 40 mounted on shaft 41 supported by main frame 20.

To intermittently drive the belt 24 to forward the tobacco leaves to the primary feed, the shaft 41 carries a ratchet 42 actuated from a pawl 43 (Fig. 2) attached to a gear 44 loosely mounted on shaft 41. The gear 44 is oscillated by means of reciprocating gear sector 45 (Fig. 2) pivoted on stud 46 supported by frame 20. Gear sector 45 is actuated through an adjustable connecting rod 47 from a cam lever 48 pivoted on stud 49 and operated by means of a cam roller 50 engaging with a cam track 51 of cam 52 mounted on the main drive shaft 23. Side guide belts 53 and 54 which are driven from rollers 55 and 56 respectively, co-act with the belt 24. The guide belts 53 and 54 move in synchronism with the feed belt 24 being connected with the driving mechanism of the latter. The roller 55 is mounted on the shaft 34 driven from bevel gear 33, and the roller 56 is mounted on shaft 57 actuated by means of a bevel gear 58 meshing with a bevel gear 59 mounted on shaft 27. The shaft 57 is supported by main frame 20. The guide belt 53 runs over idler roller 60 and 61, while belt 54 runs over the idler roller 62 and 63. The guide belts 53 and 54 have tension rollers 64 and 65, and 66 and 67 respectively. Idler rollers 61 and 63 are pivoted to supporting plates 68 and 69 respectively on brackets 70 mounted on the main frame 20.

The tobacco leaves T are placed in a thin layer upon the secondary filler feed belt 24 as shown in Fig. 1 and forwarded intermittently out over the main feed onto a swingable platform 71, each forwarding step corresponding with the length of the charge desired.

In order to prevent any disturbance or telescoping of the thin layer of tobacco during the movement which projects it across the main feed where there are no belts to push it; an endless chain belt 72 bears on the tobacco by gravity and follows its movement and the inequalities of the tobacco onto the platform 71 (Fig. 8).

The chain belt 72 travels in synchronism with the feed belt 24 and is actuated by sprockets 73 mounted on a shaft 74 supported by bearing frames 75 and 76 mounted on supporting plates 68 and 69 respectively. On the shaft 74 is mounted a pulley 77 which by means of belt 78 is driven from a pulley 79 mounted on the intermittently moving shaft 27. Chain belt 72 is led over sprockets 80 and is guided by a roller 81 pivoted to a shaft 82 supported in bearing brackets 83 and 84 mounted on supporting plates 68 and 69 respectively. Sprockets 80 are pivoted on a shaft 85 supported by arms 86 and 87 fastened to a shaft 88 loosely mounted in bearings of frames 75 and 76. The arm 86 is equipped with a cam roller 89 engaging with an open cam 90 mounted on a shaft 91 actuated by a bevel gear 92 meshing with a bevel gear 93 mounted on shaft 94. Shaft 91 is also supported in bearings by frames 75 and 76 while shaft 94 is mounted in bearings of the cutter frame 95 attached to main frame 20. Shaft 94 is actuated by a sprocket 96 which by means of chain 97 running over idler sprockets 97a and 97b is continuously driven from a sprocket 98 mounted on the main drive shaft 23.

The lower part of chain belt 72 always bears on the thin layer of tobacco on the feed belt 24 (Fig. 4). As soon as the latter starts to move the tobacco layer onto the platform 71, arms 86 and 87, which by means of sprockets 80 support the upper part of chain belt 72, descend due to the action of cam 90, thereby producing a slack in chain belt 72 which is taken up and laid upon the tobacco layer T by sprockets 73 which move in synchronism with the feed belt 24. The additional length of chain belt 72 laid upon the tobacco T corresponds with the length of movement of the feed belt 24.

Thus the chain belt 72 together with the tobacco layer T moves onto the platform 71 (Fig. 8) thereby preventing any disturbance such as arching or telescoping of the tobacco layer T found to be a source of trouble when pushing tobacco layers, and is applicable wherever a tobacco stream is pushed from a point back of its forward end.

In order to keep the chain belt 72 flat upon the tobacco layer T, a jointed guide plate 99 rests loosely on the bottom loop of chain belt 72. The guide plate 99 is provided with a number of hinged joints 100 in order that it may accommodate itself to the slope of platform 71 (Fig. 8). The hinged joints 100 are of a one-way construction so that the guide plate 99 cannot be folded upward beyond substantially horizontal position upon the retreat of chain belt 72 which will immediately take place after the desired length of tobacco layer T is moved onto the platform 71 and further feeding is arrested the chain having no linear movement along the feed belts after the feed belts stop. The retreat of the loop of chain belt 72 lying on the tobacco layer on the platform 71 is caused by the upward movement of arms 86 and 87 due to the action of cam 90. The lower loop of chain belt 72 is shortened in its horizontal portion or rolled back on the layer the same distance as it was lengthened during the advancement. In order to keep the chain belt 72 under tension, a roller 101 pivoted on arms 102 loosely mounted on studs 103, rests on the upper portion of the chain belt 72. Studs 103 are supported by bearing frames 75 and 76.

After the chain belt 72 has retreated from the tobacco layer T on the platform 71 (Fig. 9) a corrugated cutter 104, reaching over the whole width of the layer, descends and cuts the layer on the platform 71 from the tobacco on the feed belt. The corrugated cutter 104 is of such a shape that at each cut it forms the tuck-end of one length and the head-end of the next, thereby eliminating any waste of tobacco. In order to assure a clean cut, the cutter 104 passes through a cutter plate 105 which forms a bridge between feed belt 24 and platform 71 and to which the tobacco is held during cutting operation by means of a clamping die 106 which also acts as a stripper for the cutter 104 as the latter ascends. The cutter plate 105 is supported by part of main frame 20. The corrugated cutter 104 is attached to a supporting bar 107 adjustably mounted to a slide 108 vertically slidably supported by the cutter frame 95. Slide 108 is equipped with an operating lug 109 which engages a slot of cam lever 110 pivoted to stud 111 mounted in the cutter frame 95. Cam lever 110 is actuated by means of a cam roller 112 engaging in cam track 113 of cam 114 mounted on shaft 94. Cam lever 110 transmits vertical reciprocating motion to slide 108 which in turn actuates corrugated cutter 104. Clamping die 106 registering with cutter 104 is mounted on a pair of guide rods 115, slidably supported in lugs 116 of supporting bar 107. Guide rods 115 are equipped with stop collars 117 and tension springs 118 which enables clamping die 106 to stop and press upon the tobacco layer while the cutter enters the tobacco and cuts the same.

Platform 71 by means of lugs 119 is swingably mounted on rod 120 supported by bracket 121 fastened to the stationary frame plate 122 attached to main frame 20. The platform 71 when receiving the tobacco layer T is in an inclined position which facilitates the forward movement of the same (Figs. 4 and 8) but as soon as the corrugated cutters 104 start to cut the tobacco layer 2 on the platform 71, the latter descends to a horizontal position (Fig. 5) in the plane of the primary feed. The platform 71 is operated by means of an open cam 123 actuating through a cam roller 124, a cam lever 125 which by means of a connecting rod 126 and pivot joint 126a is connected to the platform 71. A tension spring 127 keeps the cam roller 124 in contact with cam 123 and also keeps the platform 71 in tension with the descending cutter 104 until the tobacco layer T on the platform is cut, thus assuring a clean cut of the tobacco layer T. As soon as the latter is cut, the cutter 104 ascends again while the platform descends to a horizontal position. Platform cam 123 is mounted on the main drive shaft 23 while cam lever 125 is loosely mounted on a sleeve 128 on shaft 129 supported in bearings of main frame 20. The end of platform 71 is also provided with corrugations 130 which register with the corrugations of the cutter plate 105 and cutter 104.

In order to assure that the platform 71 is in line with the cutter plate 105 when in the inclined position, platform 71 carries stop brackets 131 equipped with adjustable stop screws 132 which when making contact with stop lugs 133 mounted on frame plate 122 check the inclined position of platform 71. The correct horizontal position of platform 71 is checked by stop lugs 134 also mounted on frame plate 122. In synchronism with the descending platform 71 a set of clamping fingers 135 move downwardly and as soon as the platform has reached its horizontal position, engages with the surface of the tobacco layer (Figs. 5 and 10) and slidingly pushes the same from the platform in a right angle to its previous line of travel to a position between upper and lower charge guides or rails 136 and 137 (Fig. 11) set at the proper and desired vertical distance for a bunch charge. The upper charge guides 136 are supported by a bracket 138 (Figs. 1 and 3) mounted on frame plate 122 and the lower charge guides 137 are also attached to plate 122. In order to assure a good grip of the clamping fingers 135 upon the tobacco layer T, fingers 135 are provided with protruding ribs or projections 139. Clamping fingers 135 are fastened to a supporting lug 140 mounted on a stationary guide shaft 141 held by a guide lug 142 equipped with a stud 143. To the latter and shaft 141 are pivoted guide rollers 144 engaging with a guide rail 145 supported by a lug 146 mounted on a vertical operating shaft 147 slidably mounted in a guide sleeve 148 held by a bracket 149 attached to the main frame 20. Operating shaft 147 by means of link 150 is actuated from a lever 151 equipped with a cam lever 152 engaging with a roller 153 in a cam 154 mounted on main drive shaft 23. Operating lever 151 and cam lever 152 are pivoted to sleeve shaft 128. Rail 145 during its vertical motion is guided by brackets 145a fastened to frame plate 122. Due to the action of cam 154, shaft 147 receives vertical reciprocating motion which by means of rail 145, rollers 144, lug 142, shaft 141 and lug 140 is transmitted to clamping fingers 135. The horizontal reciprocating movement of clamping fingers 135 is accomplished by means of pusher arms 155 pivoted to shaft 141. Pusher arms 155 are actuated from an operating lever 156 mounted on shaft 157 supported in bearings of cutter frame 95. To shaft 157 is attached a cam lever 158 carrying a roller 159 engaging with cam 160 mounted on shaft 94.

During the forward movement of clamping fingers 135 rail 145 is in its lowermost position and not in engagement with rollers 144 so that the whole weight of the clamping fingers 135 rests on the tobacco layer T, thereby assuring a perfect grip (Fig. 10). As soon as the tobacco layer T, pushed by fingers 135, arrives in between charge guides 136 and 137 (Fig. 11) rail 145 ascends thereby also lifting clamping fingers 135 to their uppermost position. During the backward motion of fingers 135 rollers 144 ride on rail 145 and remain in contact with the latter until rail 145 descends again for the next charge. Up to this point the tobacco layer T was not disturbed and remained even and uniform as it was placed originally on the feed belt 24.

Next I pleat this thin undisturbed layer of tobacco T into a resilient column of a height determined by charge guides 136 and 137. As soon as clamping fingers 135 have released the tobacco layer T and have moved out of the way, a number of measuring fingers 161 ascend through the slots of charge guides 136 and 137 and thus by a horizontal movement push the tobacco layer T against a measuring gate 162 in order to fold the layer T into a resilient column C (Figs. 12 and 13). Measuring fingers 161 are pivoted on a shaft 163 stationarily mounted on a measuring arm 164 pivoted to a shaft 165 supported by a swingable bearing arm 166 loosely mounted on sleeve shaft 128 and equipped with a cam lever 167 carrying a roller 168 engaging in a cam track 169 of cam 170, which controls the vertical movement of measuring arm 164 and consequently that of measuring fingers 161. The horizontal forward movement of arm 164 and measuring fingers 161 is caused by the gravity of an adjustable weight 171 supported by a rod 172 mounted on arm 164. According to the setting of weight 171 the pressure of fingers 161 against the tobacco column C can be regulated, thus giving complete control over the density of the column C. In order to assure an even density in all parts of the column C each finger 161 is equipped with a tension spring 173 so that every finger 161 exerts the same pressure upon the tobacco thus producing a uniform density throughout the column C. Tension springs 173 are supported by a rod 174 held in brackets 175 attached to arm 164, which also carries a stop rod 176 against which all fingers 161 rest when not in action. Measuring gate 162 is adjustably mounted on a supporting lug 177 pivoted to studs 178 mounted on bearing lugs 179 of bridge bracket 180 attached to main frame 20. The measuring gate 162 is closed at all times except when the charge is separated from the column C and conveyed to the filler transfer F (Fig. 16).

The charge D is separated from the column C by the vertically ascending bottom piercers 181 and the vertically descending top piercers 182 (Fig. 14), which overlap each other and then separate to tear the charge D from the column C in the same fashion as a cigar maker tears the tobacco by hand (Fig. 15). After the charge D is separated from the column C, measuring fingers 161 descend below charge guide 137 and move backward. The return motion of fingers 161 is accomplished by a hook lever 164a engaging with rod 164b of measuring arm 164. Hook lever 164a is actuated by a cam lever 164c carrying a cam roller 164d engaging with an open cam 164e mounted on main drive shaft 23. Cam lever 164c is loosely mounted on shaft 164f, supported by main frame 20.

The bottom piercers 181 are mounted on a guide 183 slidably supported by vertical guide rods 184 fastened to supporting brackets 185 and bridge bracket 180. The latter also carries a guide plate 180a. Guide 183 is equipped with a lug 186 to which is pivoted a link 187 through which the bottom piercers 181 are operated by means of a lever 188 having a cam lever 189 (Figs. 3 and 5) carrying cam roller 190 engaging with cam 191 mounted on the main drive shaft 23. Lever 188 and cam lever 189 are loosely mounted on sleeve shaft 128. The bottom piercers 181 ascend first and then the top piercers 182 move downward, thereby overlapping the former. Top piercers 182 are mounted on a guide bracket 192 slidably supported by horizontal guide rods 193 mounted on guide heads 194 attached to vertical guide shafts 195 slidably supported in bearing brackets 196 mounted on frame plate 122. Guide shafts 195 through links 197 are actuated from levers 198 mounted to sleeve shaft 128. One of levers 198 is equipped with a cam lever 199 carrying a cam roller 200 engaging with a cam 201 mounted on the main drive shaft 23, thus controlling the up and down motion of top piercers 182. After the latter have descended causing the tearing of charge D from column C, the measuring gate 162 moves out of the way and piercers 182 push the charge D guided by charge guides 136 and 137 into the filler transfer F, (Fig. 16), thus eliminating an additional transfer essential in most other machines, where a straight knife is employed. The measuring gate 162 resting against a stop screw 202 is operated by means of a connecting rod 203 (Fig. 3) pivoted to supporting lug 177. Rod 203 is actuated from a lever 204 loosely mounted on shaft 129. Lever 204 has a cam lever 205 carrying a cam roller 206 engaging with cam 207 mounted on main drive shaft 23. After top piercers 182 have pushed the charge D into the filler transfer F, piercers 182 ascend again and move backward in their original position. The horizontal reciprocating motion of piercers 182 is caused by links 208 pivoted to guide bracket 192 (Figs. 3 and 6). Links 208 are actuated from levers 209 one of which is equipped with a cam roller 210 engaging in cam track 211 of cam 212 mounted on the main drive shaft 23 (Figs. 3 and 5). Levers 209 are both mounted to shaft 129.

In order to take care of the oversupply of tobacco in the column which is caused by the necessity of feeding slightly more tobacco than is used for the charges, the filler feed is equipped with a feed control mechanism which will arrest further feeding when sufficient tobacco is in the column C.

The feed control is operated by means of link 213 pivoted to shaft 163 of measuring arm 164 (Figs. 3 and 6). In slot 214 of link 213 engages a lever 215 (Figs. 3 and 5) mounted on shaft 216 supported by main frame 20. To shaft 216 is mounted a lever 217 (Fig. 2) carrying a link 218 provided with a slot 219 to which engages a double lever 220 pivoted on a shaft 221 supported by a bracket 222 attached to frame 20. To shaft 221 is also pivoted a control lever 223 which is resiliently connected to lever 220 by means of spring 224. Pawl 43, by which means the feed drive shaft 41 is actuated, is mounted on a friction pivot 225 carried by gear 44 and has a control arm 226.

In case little or no tobacco is left in the column, the forward motion of measuring arm 164 will actuate lever 215 in such a manner as to cause control lever 223 to move in the path of control arm 226 of oscillating pawl 43 thereby causing the re-engagement of the latter with ratchet 42 resulting in the continuation of the intermittent drive of shaft 41 of the filler feed. Due to its friction mounting, the oscillating pawl 43 always disengages from ratchet 42 upon its return motion and remains disengaged as long as control lever 223 is not in the path of arm 226, a condition occurring when sufficient tobacco is in the column, preventing the measuring arm 164 from advancing far enough to cause control lever 223 to move into engaging position, thereby stopping further feeding of tobacco. As soon as measuring arm 164 can move forward sufficiently to cause control lever 223 to engage pawl 43 with ratchet 42, the feeding of tobacco is resumed. A stop pin 227 mounted on bracket 222 is provided to check the position of control lever 223. The size of the feed belt 24 controls the number of charges delivered at one time, thus speeding up production and allowing more time for serving the leaves upon the feed belt 24.

After the charge D is pushed into the filler transfer F (Fig. 3) the latter places the former into a rolling apron A by which the charge D is rolled over a rolling table B into the shape of a bunch by means of rolling pin P.

What is claimed is:

1. In a cigar machine, the combination with a table, of devices for forwarding a layer of tobacco over said table, tobacco confining instrumentalities overlying said table and spaced above the same a distance substantially greater than the thickness of said layer, co-acting members adapted to engage the ends of said layer, and means for producing a relative approaching movement of said members to first pleat the layer and then squeeze the pleated layer to a predetermined density to form a filler charge.

2. In a cigar machine, the combination with a table, of devices for forwarding a layer of tobacco over said table, tobacco confining instrumentalities overlying said table and spaced above the same a distance substantially greater than the thickness of said layer, co-acting members adapted to engage the ends of said layer, means for producing a relative approaching movement of said members to first pleat the layer and then squeeze the pleated layer to a predetermined density to form a filler charge, one of said members including tobacco engaging elements and means yieldingly supporting said elements.

3. In a cigar machine, the combination with a table, of devices for forwarding a layer of tobacco over said table, tobacco confining instrumentalities overlying said table and spaced above the same a distance substantially greater than the thickness of said layer, co-acting members adapted to engage the ends of said layer, means for producing a relative approaching movement of said members to first pleat the layer and then squeeze the pleated layer to a predetermined density to form a filler charge, and mechanism for stopping the operation of the tobacco forwarding devices when the pleated layer reaches said predetermined density.

4. In a cigar machine, the combination with a table, of devices for forwarding a layer of tobacco over said table, tobacco confining instrumentalities overlying said table and spaced above the same a distance substantially greater than the thickness of said layer, co-acting members adapted to engage the ends of said layer, and means for producing a relative approaching movement of said members to first pleat the layer and then squeeze the pleated layer to a predetermined density to form a filler charge, one of said members including a plurality of relatively yieldable tobacco engaging fingers.

5. In a cigar machine, the combination with devices for feeding a layer of filler tobacco, of means for pleating said layer, and mechanism for separating a bunch charge from the pleated layer.

6. In a cigar machine, the combination with devices for feeding a layer of filler tobacco, of means for pleating said layer, mechanism for separating a bunch charge from the pleated layer, said devices including a main feed, a secondary feed for feeding a stream of tobacco transverse to the main feed and means coacting with the secondary feed to cut substantially bunch length charges from the stream of the secondary feed and deliver them sidewise onto the main feed to form a layer of tobacco thereon of a width substantially equal to one bunch length.

7. In a cigar machine, the combination with devices for feeding a layer of filler tobacco, of means for pleating said layer, and mechanism for separating a bunch charge from the pleated layer, said means including a set of spaced rails supporting said layer, a set of spaced tobacco confining rails overlying said layer, said means also including members operating in the spaces between rails to squeeze the layer edgewise.

8. In a cigar machine, the combination with devices for feeding a layer of filler tobacco, of means for pleating said layer, and mechanism for separating a bunch charge from the pleated layer, said means including a set of spaced rails supporting said layer, a set of spaced tobacco confining rails overlying said layer, said means also including members operating in the spaces between rails to squeeze the layer edgewise, said upper and lower rails being spaced apart a distance substantially greater than the thickness of said layer to facilitate pleating and to limit the pleated layer to a predetermined thickness.

9. In a cigar machine, the combination with devices for feeding a layer of filler tobacco, of means for pleating said layer, mechanism for separating a bunch charge from the pleated layer, said means including a support, a series of fingers, devices yieldingly mounting said fingers on the support, and mechanism operating said support to move the fingers against an edge of said layer.

10. In a cigar machine, the combination with devices for feeding a layer of filler tobacco, of means for pleating said layer, mechanism for separating a bunch charge from the pleated layer, said means including a support, a series of fingers, devices yieldingly mounting said fingers on the support, and mechanism operating said support to move the fingers against an edge of said layer, said devices including individual yielding connections to permit yielding movement of said fingers relative to each other.

11. The method of forming long filler bunch charges which consists in placing the leaves flat in overlapping shingled relationship to form a primary layer, squeezing a portion of the primary layer edgewise to form a thicker layer, and separating a charge from the thicker layer.

12. The method of forming long filler bunch charges which consists in placing the leaves flat in overlapping shingled relationship to form a primary layer, squeezing a portion of the primary layer edgewise to form a thicker layer, separating a charge from the thicker layer, and overlapping the leaves of said primary layer both sidewise and lengthwise of the leaves to form a layer greater in width than the width of one leaf.

13. The method of forming long filler bunch charges which consists in placing the leaves flat in overlapping shingled relationship to form a primary layer, squeezing a portion of the primary layer edgewise to form a thicker layer, and separating a charge from the thicker layer, said method including the step of confining the primary layer during said squeezing, between surfaces separated a distance substantially greater than the thickness of the layer to crumple or pleat said layer.

14. The method of forming cigar bunch charges which consists in placing the leaves in flat overlapping shingled relationship to form a thin layer one leaf or more wide, forwarding the layer, successively cutting off bunch lengths from the forward end of the layer, assembling the bunch lengths side by side to provide a layer containing more than enough filler for one bunch charge, crumpling or pleating the layer of assembled bunch lengths and separating a charge from said layer.

15. The method of forming long filler tobacco charges which includes feeding tobacco leaves forwardly in a broad thin layer, confining said layer between horizontal tobacco confining surfaces spaced apart a vertical distance approximately equal to the height of the charge desired, and substantially greater than the thickness of the layer and then squeezing the layer in a direction parallel to said surfaces to form a thicker layer.

16. The combination with means for feeding filler tobacco, of a charge receiving chamber into which said tobacco is fed, and means for separating a charge from the filler tobacco comprising a transverse series of prongs entering the layer of filler tobacco, a second series entering the tobacco in close proximity to the first series, and means for giving said series of prongs relative separating movement in a straight line.

17. The combination with means for feeding filler tobacco, of a charge receiving chamber into which said tobacco is fed, and means for separating a charge from the filler tobacco comprising a transverse series of prongs entering the layer of filler tobacco, a second series entering the tobacco in close proximity to the first series, and means for giving said series of prongs relative separating movement, said prongs being of chisel edge formation and having an inward movement with the edge of one series of prongs engaging a surface of the other series of prongs to facilitate entry in adjacent position within the filler layer.

18. The combination with means for feeding filler tobacco, of a charge receiving chamber into which said tobacco is fed, and means for separating a charge from the filler tobacco comprising a transverse series of prongs entering the layer of filler tobacco from below, a second series entering the tobacco from above in close proximity to the first series, and means for giving said series of prongs relative separating movement in a straight line, said means including devices connected to said prongs and having movement in a generally vertical direction transverse to the plane of filler layer to move said series relatively to each other and into the layer.

19. In a cigar bunch machine, devices for feeding a layer of filler tobacco including sets of spaced rails above and below the filler and extending in the direction of feeding movement, to confine and support the filler, and mechanism for separating a charge from said filler layer comprising sets of piercing elements movable between said rails to pierce the filler therebetween, and means for giving said sets of piercing elements relative separating motion to separate the charge.

20. In a cigar bunch machine, devices for feeding a layer of filler tobacco including sets of spaced rails above and below the filler and extending in the direction of feeding movement, to confine and support the filler, and mechanism for separating a charge from said filler layer comprising sets of piercing elements movable between said rails to pierce the filler therebetween, means for giving said sets of piercing elements relative separating motion to separate the charge, and a filler transfer chamber movable to a position registering with the space between said rails.

21. In a cigar bunch machine, devices for feeding a layer of filler tobacco including sets of spaced rails above and below the filler and extending in the direction of feeding movement, to confine and support the filler, and mechanism for separating a charge from said filler layer comprising sets of piercing elements movable between said rails to pierce the filler therebetween, means for giving said sets of piercing elements relative separating motion to separate the charge, said rails extending and said means operating to separate said piercers in a right line extending in the direction of feeding movement of said devices.

22. In a cigar machine, the combination with primary tobacco forwarding means, of secondary tobacco forwarding means, transverse to said primary means for feeding tobacco crosswise over the primary means including projectable and retractable mechanism adapted to engage the upper surface of the tobacco in said secondary means, and means for projecting said mechanism over the primary feed while in engagement with said tobacco.

23. In a cigar machine, the combination with primary tobacco forwarding means, of secondary tobacco forwarding means, transverse to said primary means for feeding tobacco crosswise over the primary means including projectable and retractable mechanism adapted to engage the upper surface of the tobacco in said secondary means, and means for projecting said mechanism over the primary feed while in engagement with said tobacco, said mechanism including a flexible tobacco engaging instrumentality adapted to accommodate itself to irregularities of the tobacco.

24. In a cigar machine, the combination with primary tobacco forwarding means, of secondary tobacco forwarding means, transverse to said primary means for feeding tobacco crosswise over the primary means including projectable and retractable mechanism adapted to engage the upper surface of the tobacco in said secondary means, and means for projecting said mechanism over the primary feed while in engagement with said tobacco, said mechanism including a flexible chain.

25. In a cigar machine, the combination with primary tobacco forwarding means, of secondary tobacco forwarding means, transverse to said primary means for feeding tobacco crosswise over the primary means including projectable and retractable mechanism adapted to engage the upper surface of the tobacco in said secondary means, and means for projecting said mechanism over the primary feed while in engagement with said tobacco, said mechanism including a flexible tobacco engaging instrumentality adapted to accommodate itself to irregularities of the tobacco and a flexible guide for said instrumentality.

26. In a filler feed, the combination with primary means for forwarding filler tobacco, of secondary means for feeding tobacco crosswise of the primary means, and means cooperating with the secondary means to provide a surface extending downwardly in the direction of movement of the filler forwarded by the secondary means for facilitating projecting of said filler tobacco to a position overlying the primary means.

27. Means for projecting a bunch length of the forward end of a stream of tobacco over a relatively stationary supporting surface, comprising devices for supporting and feeding forwardly the portion of said stream to the rear of said length, mechanism resting on the upper surface of said length and means causing said mechanism to project forwardly over the supporting surface in synchronism with the operation of said devices while in contact with said surface.

28. A device for forwarding a stream of tobacco comprising mechanism acting on the bottom side of the stream to forward the same, movable flexible means adapted to accommodate itself to irregularities of the tobacco stream engaging the upper surface of the stream, and mechanism for giving said means projecting movement to assist in forwarding the tobacco.

29. A device for forwarding a stream of tobacco comprising a feedway for said stream, and movable flexible means adapted to accommodate itself to irregularities of the tobacco and resting on the tobacco, and mechanism for giving the portion of said means engaging the tobacco projecting movement to feed the tobacco along said feedway.

30. Means for forwarding a stream of tobacco comprising a flexible endless member having a length engaging a surface of said stream, mechanism for driving said member to give the same feeding movement, and means alternately laying an additional length of said member in contact with said stream and withdrawing the same from contact therewith.

31. Means for forwarding a stream of tobacco comprising a flexible endless member having a length engaging a surface of said stream, mechanism for driving said member to give the same feeding movement, and means alternately laying an additional length of said member in contact with said stream and withdrawing the same from contact therewith, said laying means including mechanism for rolling the flexible member back on the stream to withdraw said length.

32. In a cigar bunch machine, the combination with a feedway, of a transverse filler feed on a different level from said feedway for feeding a stream of tobacco transversely of said feedway, and a transfer plate having a filler supporting surface and which is movable between an inclined position in which one of its edges is substantially level with said filler feed, and a horizontal position in which the said supporting surface is substantially in the plane of said feedway, and means for moving said plate from one position to the other.

33. In a cigar bunch machine, the combination with a feedway, of a transverse filler feed on a different level from said feedway for feeding a stream of tobacco transversely of said feedway, and a transfer plate having a filler supporting surface and which is movable between an inclined position in which one of its edges is substantially level with said filler feed, and a horizontal position in which the said supporting surface is substantially in the plane of said feedway, and means for moving said plate from one position to the other, said moving means including mechanism for swinging said plate acting to incline the same at the first mentioned position.

34. In a cigar machine, the combination with a main feed for feeding a layer of filler tobacco, of a secondary feed for feeding a stream of tobacco transversely of said main feed, said secondary feed being located on a level above the main feed and acting to push a bunch length at the forward end of said stream beyond the end of said feed, tobacco separating means for separating said length from said stream, and a slanting shelf extending downwardly in the direction of movement of the tobacco stream beyond the end of said feed to facilitate said pushing action.

35. Means for feeding a layer of tobacco over a table, comprising spaced clamping fingers overlying said layer, depending projections on said fingers arranged along the direction of feeding movement, and mechanism for giving said spaced clamping fingers down, forward, upward and backward movement respectively to engage the layer, feed it along the table, disengage from the same and return while disengaged, said mechanism operating to permit the whole weight of the fingers to rest on the tobacco during their forward movement, thereby assuring a perfect grip.

36. Means for feeding a layer of tobacco over a table, comprising a plate overlying said layer, depending projections in said plate including projections arranged along the direction of feeding movement, mechanism for giving said plate down, forward, upward and backward movement respectively to engage the layer, feed it along the table, disengage from the same and return while disengaged, and a series of spaced confining rails overlying said table and extending in the direction of feeding movement along the same, said plate comprising a series of spaced members movable between said rails.

37. In a cigar bunch machine, the combination with a primary filler feed, of a secondary filler feed for feeding a stream of filler tobacco transversely of said primary feed, means for separating bunch lengths from said stream and transferring them to said primary feed with their lengths extending crosswise of the primary feed, means for pleating the filler tobacco on the primary feed, and mechanism for separating a bunch charge from the pleated filler tobacco, said mechanism including two sets of separating elements, and means for moving said elements into the tobacco in close proximity to each other and then separating said sets to separate the charge.

38. In a cigar machine, the combination with a support for a mass of filler tobacco, of a filler transfer having a charge receiving pocket movable into alignment with said support, charge separating mechanism, and means operating said charge separating mechanism to cause the same to first separate a charge from said mass and then move the separated charge along said support into said pocket.

39. In a cigar bunch machine, the combination with a primary filler feed, of a secondary filler feed for feeding a stream of filler tobacco transversely of the primary feed, means for separating bunch lengths from said stream and transferring them to said primary feed with their lengths extending crosswise of the primary feed, means for pleating the filler tobacco on the primary feed, mechanism for separating a bunch charge from the pleated filler tobacco, and mechanism controlled from said pleating means for incapacitating the secondary feed when there is an excess of tobacco on the main feed.

40. In a cigar bunch machine, the combination with a primary filler feed, of a secondary filler feed for feeding a stream of filler tobacco transversely of the primary feed, means for separating bunch lengths from said stream and transferring them to said primary feed with their lengths extending crosswise of the primary feed, a charge transfer adapted to receive bunch charges separated from the filler tobacco on the main feed, and piercers adapted to separate a bunch charge from the filler tobacco on the main feed and deliver it to said charge transfer.

CHARLES V. LINDBLAD.